United States Patent [19]
Sieuzac

[11] 3,905,443
[45] Sept. 16, 1975

[54] WALLS WITH RESONANT CAVITIES

[76] Inventor: Jean Louis Sieuzac, 3, rue de Sfax, 75016 Paris, France

[22] Filed: Nov. 1, 1973

[21] Appl. No.: 411,900

[30] Foreign Application Priority Data
Nov. 6, 1972 France .............................. 72.39247

[52] U.S. Cl. .............................................. 181/33 G
[51] Int. Cl. .............................................. E04b 1/99
[58] Field of Search ............ 181/33 G, 53 K, 63, 71, 181/72; 161/68; 52/145

[56] References Cited
UNITED STATES PATENTS

| | | | |
|---|---|---|---|
| 3,022,607 | 2/1962 | Toulmin, Jr. ...................... | 181/33 G |
| 3,043,730 | 7/1962 | Adie .................................. | 181/33 G |
| 3,249,659 | 5/1966 | Voelker ............................. | 181/33 G |
| 3,351,154 | 1/1967 | Kodaras ............................ | 181/33 G |
| 3,380,206 | 4/1968 | Barnett ............................. | 181/33 G |
| 3,481,427 | 12/1969 | Dobbs et al. ..................... | 181/33 G |
| 3,504,761 | 4/1970 | Sullivan et al. ................... | 181/33 G |
| 3,630,818 | 12/1971 | Allen ................................. | 161/68 |
| 3,638,573 | 2/1972 | Campbell .......................... | 161/68 |
| 3,655,818 | 4/1972 | McKown ............................ | 161/68 |
| 3,693,750 | 9/1972 | Takkunen ......................... | 181/33 G |

FOREIGN PATENTS OR APPLICATIONS 206,535   4/1956   Austria ................................ 52/145

Primary Examiner—Joseph W. Hartary
Assistant Examiner—Vit W. Miska
Attorney, Agent, or Firm—Mason, Fenwick & Lawrence

[57] ABSTRACT

Sound absorbing members having resonant cavities of different frequency absorption character are made by forcing a structure having open-ended parallel honeycomb cavities through one or more sheets of plastic foam so that foam plugs fill a portion of each cavity; selected foam plugs are removed in order to obtain cavities of different depths and different frequency absorption character, and a closure plate is guided to one side and a porous plate is glued to the other side of the structure.

4 Claims, 6 Drawing Figures

PATENTED SEP 16 1975  3,905,443

WALLS WITH RESONANT CAVITIES

The present invention relates to walls with parallel resonators intended for absorbing acoustic vibrations and in particular for turbo-reactors used in aviation.

Such absorbent walls have been made by using a honeycomb structure between two plates, each cavity communicating with the chamber or enclosure where it is desired to absorb the sounds, or by means of a porous plate, or by holes perforated in the plate.

These cavities having the same depth act as resonator but are only effective for a certain frequency. To absorb several frequencies, it is necessary to provide cavities with different depths, but the manufacture of such a structure presents such difficulties, industrially speaking, that it is not employed.

The aim of the invention is to provide a simple means which may easily be made on an industrial scale, which would enable absorbent walls of different depths to be manufactured.

The invention has for its object a method of making a wall with resonant cavities, constituted of a structure comprising cavities with parallel transverse axes, of different depths, characterised in that a structure comprising cavities with parallel axes, of the same depth, of the honeycomb type for example, is driven in through a sheet of plastic foam which fills an identical portion of each cavity, the foam obturating the cavities then being selectively removed from certain cavities in order to obtain cavities of different depths, once the structure is glued between two plates, one for closure and the other porous or perforated.

The invention will be more readily understood on reading the following description with reference to the accompanying drawings, in which.

In order to make an absorbent wall with parallel resonant cavities of different depths, a honeycomb structure 1, 20 mm thick, for example, is placed on a sheet 2 of isocyanate plastics foam, 10 mm thick, of density 50 kg/m$^3$.

Figure 1:
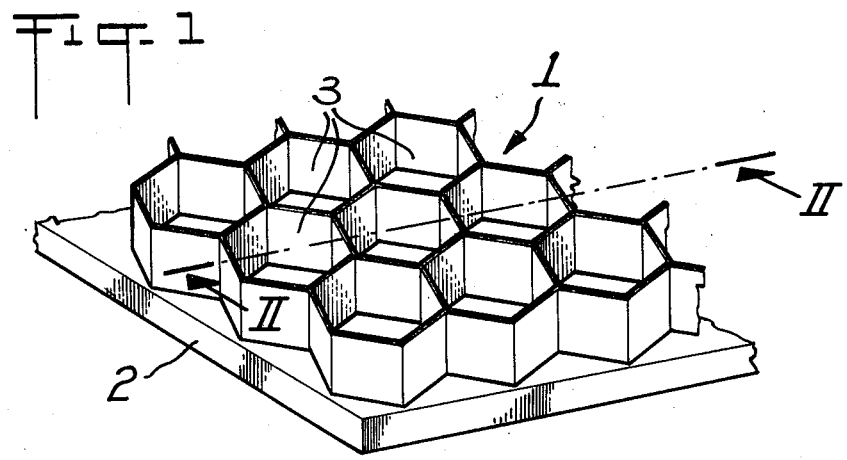
FIG. 1 is a perspective view of a honeycomb structure placed on a sheet of plastics foam, which represents the first operation of the method according to the invention.
Figure 2:
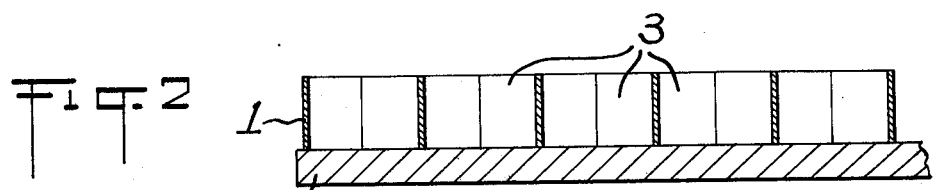
FIG. 2 is a section along II—II of FIG. 1.
Figure 3:
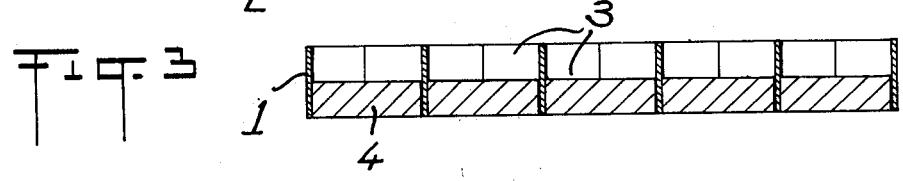
FIGS. 3 to 6 are sections similar to those of FIG. 2 showing the different phases of the method according to the invention.

The structure 1 is driven into the foam sheet, this filling a part of each cavity 3 of the structure (FIG. 3) and closing them by plugs 4.

Figure 4:
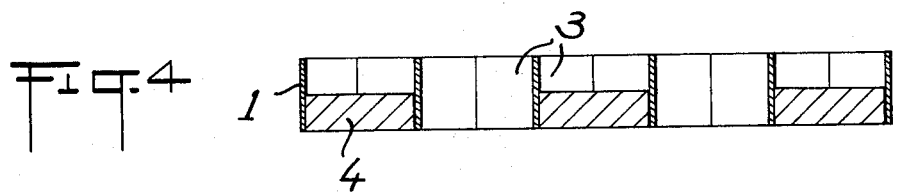
Figure 5:
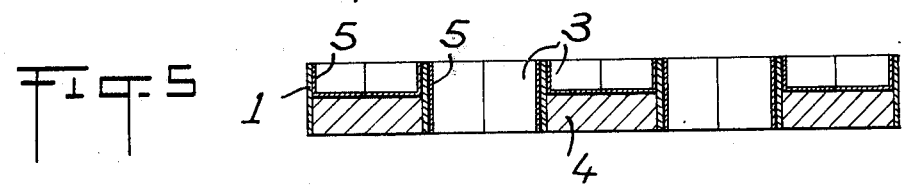
Figure 6:
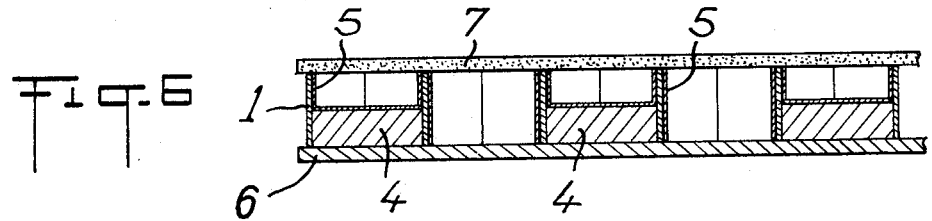

The plugs 4 of foam are then expelled from certain cavities, for example one out of two (FIG. 4). This expulsion may be effected mechanically by fingers pushed through the cavities, or pneumatically by blowing through the desired cavities.

The foam plugs 4 which close certain cavities are then held in place by a coating 5 of phenol or epoxy resin, this coating 5 uniformly applied to all the cavities 3 protects the walls and the foam plugs 4 against corrosion and erosion. This structure thus constituted will then be glued between two plates, one, 6, which is applied against the foam plugs and forms the outer side of the wall and the other, 7, either composed of porous material or provided with holes opposite each cavity, this plate 7 forming the inner side of the wall, facing the sounds to be absorbed.

Thus, a wall is obtained with two series of different resonant cavities, each acting for a given frequency range.

If it is desired to obtain three or more series of different cavities, when the alveolar structure has been driven into the foam and certain cavities have had their foam plug 4 removed, this structure is driven into a second sheet of plastics foam and the foam is again removed from a part of the cavities whose plugs had been removed the first time.

This second partial filling operation of the cavities may be repeated to obtain several series of resonant cavities of different depths.

The plugs are then fixed by the adhesive resin after the last partial filling operation of the cavities has been effected.

What I claim is:

1. A method of making a sound absorbing wall having resonant cavities of different depths and different frequency absorption characteristics extending with parallel transverse axes, said method comprising the steps of providing a structure having honeycomb cavities with parallel axes, forcing said structure through a sheet of cured plastic foam which provides a foam plug filling an identical portion of each cavity, selectively removing the foam plugs from desired ones of said cavities in order to obtain cavities of different depths and different frequency absorption characteristics, gluing a closure plate to one side of said structure and gluing a porous plate to other side of said structure.

2. The method of claim 1 additionally including the step of forcing said structure through a second sheet of plastic foam subsequent to the forcing of said structure through the first sheet of plastic foam to provide a second group of plugs in said cavities and removing selected ones of said plugs of said second group prior to the gluing of said plates to said structure.

3. The method of claim 1 including the additional step of coating the interiors of said cavities and the plugs therein with adhesive resin.

4. The method of claim 2 including the additional step of coating the interiors of said cavities and the plugs therein with adhesive resin.

* * * * *